(12) United States Patent  
Mukasa et al.

(10) Patent No.: US 11,880,064 B2  
(45) Date of Patent: Jan. 23, 2024

(54) OPTICAL FIBER

(71) Applicant: FURUKAWA ELECTRIC CO., LTD., Tokyo (JP)

(72) Inventors: Kazunori Mukasa, Tokyo (JP); Tamas Mihalffy, Budapest (HU); Zoltan Varallyay, Budapest (HU)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/651,979

(22) Filed: Feb. 22, 2022

(65) Prior Publication Data

US 2022/0179150 A1 Jun. 9, 2022

Related U.S. Application Data

(63) Continuation of application No. PCT/JP2020/032396, filed on Aug. 27, 2020.

(30) Foreign Application Priority Data

Aug. 30, 2019 (JP) .................................. 2019-158333

(51) Int. Cl.  
*G02B 6/02* (2006.01)  
*C03C 25/1065* (2018.01)

(52) U.S. Cl.  
CPC ...... *G02B 6/02395* (2013.01); *C03C 25/1065* (2013.01); *G02B 6/02214* (2013.01)

(58) Field of Classification Search  
CPC ............ G02B 6/02395; G02B 6/02214; C03C 25/1065  
See application file for complete search history.

(56) References Cited

U.S. PATENT DOCUMENTS 7,747,120 B2 * 6/2010 Seo ..................... G02B 6/02395  
                                                               385/127  
7,787,731 B2 * 8/2010 Bookbinder ......... G02B 6/0288  
                                                               385/127

(Continued)

FOREIGN PATENT DOCUMENTS

CN           110383130 B  *  6/2021  ............... G02B 6/02  
EP             1341011 A1  *  9/2003  ....... C03B 37/01807

(Continued)

OTHER PUBLICATIONS

Chiu et al., Design Considerations in Reduced-Diameter Single-Mode Optical Fibers, NUWC-NPT Technical Report 11,390, 2002 (Year: 2002).*

(Continued)

*Primary Examiner* — Peter Radkowski  
(74) *Attorney, Agent, or Firm* — Oblon, McClelland, Maier & Neustadt, L.L.P.

(57) ABSTRACT

An optical fiber includes: a core made of silica based glass; a cladding made of silica based glass, the cladding having a refractive index that is lower than a maximum refractive index of the core; and a coating including a primary coating layer, and a secondary coating layer. An outer diameter of the cladding is less than 100 μm. A thickness of the primary coating layer is larger than or equal to 15 μm. A mode field diameter at a wavelength of 1310 nm is larger than or equal to 8.6 μm and smaller than or equal to 9.2 μm. An effective cutoff wavelength is smaller than or equal to 1260 μm. A bending loss at a wavelength of 1550 nm when bending is made at a diameter of 60 mm is smaller than or equal to 0.1 dB/100 turn.

7 Claims, 3 Drawing Sheets

(56) References Cited

U.S. PATENT DOCUMENTS

| | | | | |
|---|---|---|---|---|
| 8,031,997 B2* | 10/2011 | Overton | G02B 6/02395 | 385/112 |
| 8,041,167 B2* | 10/2011 | Overton | C03C 25/106 | 385/100 |
| 8,041,168 B2* | 10/2011 | Overton | G02B 6/02395 | 385/100 |
| 8,081,853 B2* | 12/2011 | Overton | C03C 25/106 | 385/100 |
| 8,145,026 B2* | 3/2012 | Overton | C03C 25/106 | 385/103 |
| 8,145,027 B2* | 3/2012 | Overton | C03C 25/106 | 385/127 |
| 8,165,439 B2* | 4/2012 | Overton | G02B 6/02395 | 385/113 |
| 8,385,705 B2* | 2/2013 | Overton | C03C 25/105 | 385/127 |
| 8,406,592 B2* | 3/2013 | Abbott, III | G02B 6/0288 | 385/124 |
| 8,467,650 B2* | 6/2013 | Overton | C03C 25/106 | 385/100 |
| 8,600,206 B2* | 12/2013 | Overton | G02B 6/02395 | 385/100 |
| 8,655,133 B2* | 2/2014 | Yamamoto | G02B 6/03627 | 398/208 |
| 8,744,226 B2* | 6/2014 | Nakanishi | C03C 25/1065 | 385/128 |
| 9,244,220 B2* | 1/2016 | Overton | C03C 25/106 | |
| 9,481,599 B2* | 11/2016 | Bickham | C03B 37/0253 | |
| 9,746,605 B2 | 8/2017 | Sohma et al. | | |
| 9,964,697 B2 | 5/2018 | Maruyama et al. | | |
| 10,852,473 B2* | 12/2020 | Pastouret | G02B 6/02342 | |
| 2002/0078715 A1* | 6/2002 | Ishihara | C03B 37/02772 | 65/537 |
| 2008/0317421 A1* | 12/2008 | Seo | G02B 6/02395 | 385/128 |
| 2009/0154888 A1* | 6/2009 | Abbott, III | G02B 6/0365 | 385/124 |
| 2010/0092138 A1* | 4/2010 | Overton | G02B 6/02395 | 385/113 |
| 2010/0092139 A1* | 4/2010 | Overton | G02B 6/02395 | 385/112 |
| 2010/0092140 A1* | 4/2010 | Overton | G02B 6/02395 | 385/112 |
| 2010/0119202 A1* | 5/2010 | Overton | C03C 25/106 | 385/100 |
| 2010/0135623 A1* | 6/2010 | Overton | G02B 1/048 | 385/100 |
| 2010/0135624 A1* | 6/2010 | Overton | G02B 6/02395 | 385/103 |
| 2010/0135625 A1* | 6/2010 | Overton | C03C 25/106 | 385/114 |
| 2010/0290781 A1* | 11/2010 | Overton | C03C 25/106 | 385/100 |
| 2011/0069932 A1* | 3/2011 | Overton | G02B 1/048 | 385/100 |
| 2011/0211788 A1* | 9/2011 | Yamamoto | G02B 6/03627 | 385/28 |
| 2012/0189258 A1* | 7/2012 | Overton | C03C 25/105 | 385/124 |
| 2013/0064516 A1* | 3/2013 | Nakanishi | G02B 6/02395 | 385/128 |
| 2014/0086548 A1* | 3/2014 | Overton | C03C 25/106 | 385/141 |
| 2014/0226941 A1* | 8/2014 | Tanaka | G02B 6/02395 | 385/100 |
| 2015/0251945 A1* | 9/2015 | Nakanishi | C03B 37/0253 | 65/435 |
| 2017/0285257 A1 | 10/2017 | Maruyama et al. | | |
| 2017/0343751 A1* | 11/2017 | Bookbinder | G02B 6/4432 | |
| 2019/0170934 A1* | 6/2019 | Pastouret | G02B 6/03694 | |
| 2019/0384000 A1* | 12/2019 | Tamura | G02B 6/44 | |

FOREIGN PATENT DOCUMENTS

| | | | | |
|---|---|---|---|---|
| EP | 1403669 A2 * | 3/2004 | | G02B 6/02261 |
| EP | 2899168 A1 * | 7/2015 | | C03B 37/0253 |
| EP | 2899168 B1 * | 1/2018 | | C03B 37/0253 |
| JP | 5-19144 A | 1/1993 | | |
| JP | 2003337241 A * | 11/2003 | | G02B 6/02261 |
| JP | 2013-125064 A | 6/2013 | | |
| JP | 5396468 B2 * | 1/2014 | | G02B 6/02333 |
| JP | 2014067020 A * | 4/2014 | | G02B 6/02014 |
| JP | 2015-219271 A | 12/2015 | | |
| JP | 6361101 B2 * | 7/2018 | | G02B 6/02014 |
| WO | WO-0127667 A2 * | 4/2001 | | G02B 6/02004 |
| WO | WO-03076991 A1 * | 9/2003 | | G02B 6/02261 |
| WO | WO-2010122790 A1 * | 10/2010 | | G02B 6/02333 |
| WO | WO 2016/190297 A1 | 12/2016 | | |
| WO | WO 2018/159146 A1 | 9/2018 | | |
| WO | WO-2018159146 A1 * | 9/2018 | | G02B 6/02 |

OTHER PUBLICATIONS

Senor et al., Optical Fiber Communications Principles and Practice, 3rd Edition, Jul. 2018 (Year: 2018).*

Corning-SMF-28, Corning Single Mode Optical Fiber, 2002 (Year: 2002).*

Corning RC SMF, Specialty Optical Fibers—low loss fused components for EDFA and small bend radius applications, 2018 (Year: 2018).*

Corning, High Fiber Count Cable Miniaturization using SMF-28 Ultra 200 Fiber, White Paper WP8200, Corning, 2015 (Year: 2015).*

Murase et al., "Development of Small Diameter Optical Fiber", Showa Cable Review vol. 53, No. 1, 2003, 13 pages (with machine generated English translation).

International Search Report dated Nov. 10, 2020 in PCT/JP2020/032396, filed on Aug. 27, 2020, 2 pages.

Extended European Search Report, dated Nov. 7, 2023 in European Application No. 20858408.6, 8 pages.

* cited by examiner

OPTICAL FIBER

This application is a continuation of International Application No. PCT/JP2020/032396, filed on Aug. 27, 2020 which claims the benefit of priority of the prior Japanese Patent Application No. 2019-158333, filed on Aug. 30, 2019, the entire contents of which are incorporated herein by reference.

BACKGROUND

The present disclosure relates to an optical fiber.

In the field of data communication or telecommunication, an optical fiber having a small diameter has attracted attention as an optical fiber that implements a high-density optical fiber cable. The small diameter optical fiber mentioned here is an optical fiber in which the diameter of a portion mainly made of glass is reduced and that has a small cladding diameter. However, an optical fiber in which an outer diameter including a coating portion that is formed so as to cover an outer periphery of a cladding portion is reduced in accordance with a reduction in cladding diameter is also included in the small diameter optical fiber.

Conventionally, as an optical fiber having a small diameter, a structure in which a relative refractive-index difference of a core portion with respect to a cladding portion is increased is disclosed (Murase, et al., "Development of small diameter cladding fiber", Review of SWCC Showa Group technical review, vol. 53, No. 1, pp. 32-36, 2003). With the optical fiber disclosed in Murase, et al., the relative refractive-index difference is increased; therefore, the characteristic thereof does not conform to the standard of the average single mode optical fiber (hereinafter, referred to as G.652 standard) defined by the International Telecommunication Union (ITU-T) 6.652. Furthermore, as an optical fiber having a small diameter, a structure including a trench layer having the relative refractive-index difference that is larger than or equal to −0.08% is disclosed (WO 2016/190297). The optical fiber disclosed in WO 2016/190297 conforms to 6.652 standard and the cladding diameter of the optical fiber is about 100 μm to 125 μm. Furthermore, as an optical fiber having a small diameter, a structure that includes a primary coating layer and a secondary coating layer as a coating portion and the secondary coating layer is set to be larger than or equal to 25 μm is disclosed (Japanese Laid-open Patent Publication No. 5-19144). The cladding diameter of the optical fiber disclosed in Japanese Laid-open Patent Publication No. 5-19144 is 125 μm; however, a small diameter is implemented by reducing the thickness of coating.

Furthermore, in Japanese Laid-open Patent Publication No. 2015-219271, a structure that suppresses a microbending loss in an optical fiber having a relatively large effective core area (Aeff), such as larger than or equal to 130 μm², is disclosed. The optical fiber disclosed in Japanese Laid-open Patent Publication No. 2015-219271 has a structure in which the outer diameter of the primary coating layer is larger than or equal to 185 μm and smaller than or equal to 220 μm, and the outer diameter of the secondary coating layer is larger than or equal to 225 μm and smaller than or equal to 260 μm.

SUMMARY

The optical fiber that conforms to 6.652 standard is widely used to be laid on, for example, the land. Accordingly, there are demands for optical fibers having high compatibility with respect to G.652 standard and further smaller diameter.

There is a need for an optical fiber having high compatibility with respect to G.652 standard and further smaller diameter.

According to one aspect of the present disclosure, there is provide an optical fiber including: a core made of silica based glass; a cladding made of silica based glass and configured to cover an outer periphery of the core, the cladding having a refractive index that is lower than a maximum refractive index of the core; and a coating configured to cover an outer periphery of the cladding, the coating including a primary coating layer located on the cladding side, and a secondary coating layer located on an outer peripheral side of the primary coating layer, wherein an outer diameter of the cladding is less than 100 μm, a thickness of the primary coating layer is larger than or equal to 15 μm, a mode field diameter at a wavelength of 1310 nm is larger than or equal to 8.6 μm and smaller than or equal to 9.2 μm, an effective cutoff wavelength is smaller than or equal to 1260 μm, and a bending loss at a wavelength of 1550 nm when bending is made at a diameter of 60 mm is smaller than or equal to 0.1 dB/100 turn.

DETAILED DESCRIPTION

Figure 1:
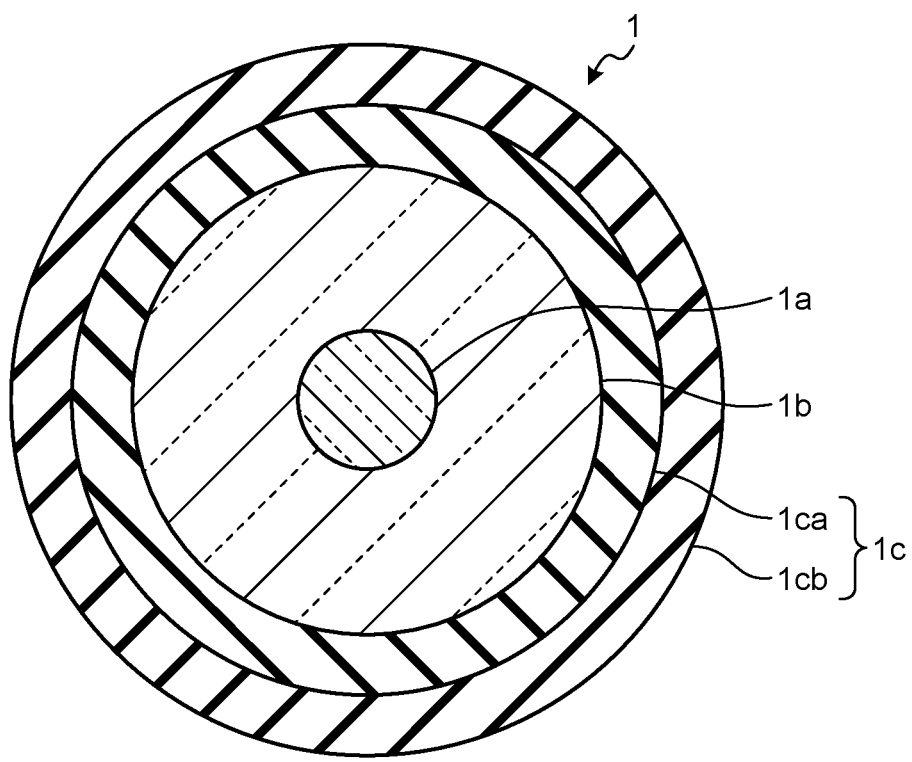
FIG. 1 is a schematic cross-sectional view of an optical fiber according to an embodiment.

Embodiments of the present disclosure will be described in detail below with reference to the drawings. The present disclosure is not limited by the embodiments described below. Furthermore, in each of the drawings, the same reference numerals will be assigned to components that are the same or corresponding to each other, as appropriate. In addition, in the present specification, a cutoff wavelength or an effective cutoff wavelength means a cable cutoff wavelength that is defined by International Telecommunication Union (ITU-T) G.650.1. Furthermore, other terms that are not particularly defined in the present specification conform to the definition or the measurement method according to 6.650.1 and 6.650.2.

FIG. 1 is a schematic cross-sectional view of an optical fiber according to an embodiment. An optical fiber 1 includes a core portion 1a that is located at an approximately center thereof, a cladding portion 1b that covers an outer periphery of the core portion 1a, and a coating portion 1c that covers an outer periphery of the cladding portion 1b.

Both of the core portion 1a and the cladding portion 1b are made of silica based glass. For example, the core portion 1a is made of silica based glass doped with a dopant, such as germanium (Ge) or fluorine (F), for adjusting the refractive index. The cladding portion 1b has a refractive index that is lower than a maximum refractive index of the core portion 1a. The cladding portion 1b is made of, for example, pure silica glass that does not contain a dopant for adjusting the refractive index. The portion formed of the core portion 1*a* and the cladding portion 1*b* is sometimes referred to as a glass optical fiber.

An outer diameter of the cladding portion 1*b* (hereinafter, sometimes referred to as a cladding diameter or a glass diameter) is less than 100 μm, and is smaller than the cladding diameter, which is about 125 μm, of the single mode optical fiber that conforms to G.652 standard. Furthermore, the cladding diameter is preferably smaller than or equal to 85 μm in terms of a reduction in diameter, and is more preferably smaller than or equal to 82 μm. In a description below, the single mode optical fiber that conforms to G.652 standard will be sometimes referred to as a standard SMF as the standard optical fiber. In general, this type of standard SMF includes a resin coating portion with a thickness of about 62.5 μm on an outer periphery of a cladding portion. The resin coating portion is formed of, for example, in a case of a two-layer structure, a primary coating layer with the thickness of about 37.5 μm, and a secondary coating layer that is located on the outer peripheral side of the primary coating layer and that has a thickness of about 25 μm. Accordingly, the outer diameter of the resin coating portion is about 250 μm.

Figure 2A:
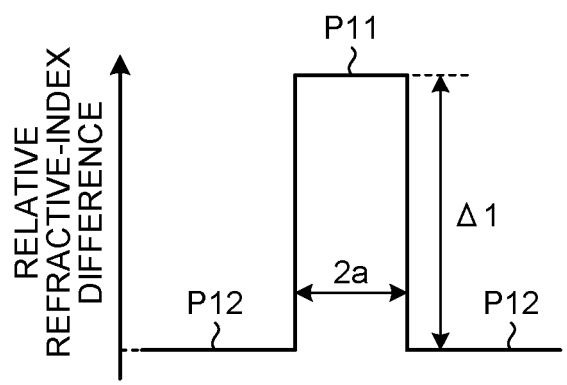
FIG. 2A is a schematic diagram of a step-type refractive index profile that is applicable to the optical fiber according to the embodiment.
Figure 2B:
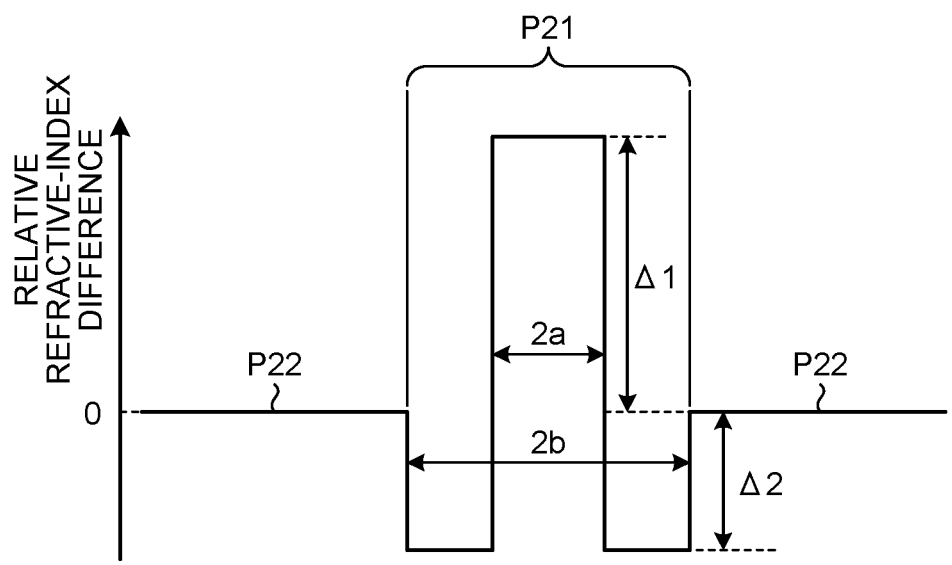
FIG. 2B is a schematic diagram of a W-type refractive index profile that is applicable to the optical fiber according to the embodiment.

The optical fiber 1 has refractive index profiles as illustrated in, for example, FIG. 2A and FIG. 2B. FIG. 2A and FIG. 2B each indicate a refractive index profile in a radial direction from the central axis of the core portion 1*a* of the optical fiber 1.

FIG. 2A illustrates a step-type refractive index profile. In FIG. 2A, a profile P11 indicates a refractive index profile of the core portion 1*a*, and a profile P12 indicates a refractive index profile of the cladding portion 1*b*. Furthermore, the refractive index profile is indicated by a relative refractive-index difference with respect to the cladding portion 1*b*. In the step-type refractive index profile, a diameter (core diameter) of the core portion 1*a* is 2*a*, and a relative refractive-index difference of the core portion 1*a* with respect to the cladding portion 1*b* is Δ1. It is preferable that Δ1 be, for example, larger than or equal to 0.33% and smaller than or equal to 0.40°.

FIG. 2B illustrates what is called a W-type refractive index profile. In FIG. In 2B, a profile P21 indicates a refractive index profile of the core portion 1*a*, and a profile P22 indicates a refractive index profile of the cladding portion 1*b*. In the W-type refractive index profile, the core portion 1*a* includes a central core portion with the diameter of 2*a* and a depressed layer that is formed so as to surround an outer periphery of the central core portion, that has a refractive index that is smaller than a refractive index of the cladding portion, that has inner diameter of 2*a*, and that has an outer diameter of 2*b*. A relative refractive-index difference of the central core portion with respect to the cladding portion 1*b* is Δ1. A relative refractive-index difference of the depressed layer with respect to the cladding portion 1*b* is Δ2. It is preferable that Δ1 be, for example, larger than or equal to 0.33% and smaller than or equal to 0.40%. It is preferable that Δ2 be, for example, larger than or equal to −0.20% and less than 0%. It is preferable that b/a be, for example, smaller than or equal to 5.

A description will be made by referring back to FIG. 1, the coating portion 1*c* is a coating made of, for example, resin, and has a function to protect the glass portion of the optical fiber 1. The coating portion 1*c* is made of, for example, UV-curable resin. Examples of the UV curable resin used for the coating portion 1*c* include urethane acrylate based resin, polybutadiene acrylate based resin, epoxy acrylate based resin, silicone acrylate based resin, and polyester acrylate based resin; however, UV-curable resin is not particularly limited as long as the material is used for coating of an optical fiber.

The coating portion 1*c* includes a primary coating layer 1*ca* that is located on the cladding portion 1*b* side, and a secondary coating layer 1*cb* that is located on an outer peripheral side of the primary coating layer 1*ca*. A Young's modulus of the primary coating layer 1*ca* is about 0.2 to 1.5 MPa and is, in the present embodiment, 0.5 MPa. A Young's modulus of the secondary coating layer 1*cb* is about 500 to 2000 MPa and is, in the present embodiment, 1000 MPa.

An outer diameter of the optical fiber 1 including the coating portion 1*c* is, for example, smaller than or equal to 210 μm. A thickness of the primary coating layer 1*ca* is, for example, larger than or equal to 15 μm.

The optical fiber 1 according to the present embodiment has the characteristics indicating that the core diameter is larger than or equal to 7 μm and smaller than or equal to 10 μm (a core radius a is larger than or equal to 3.5 μm and smaller than or equal to 5.0 μm), a mode field diameter (MFD) at a wavelength of 1310 nm is larger than or equal to 8.6 μm and smaller than or equal to 9.2 μm, an effective cutoff wavelength (λcc) is smaller than or equal to 1260 nm, a bending loss at a wavelength of 1550 nm when bending is made at the diameter of 60 mm (hereinafter, appropriately referred to as a macrobending loss) is smaller than or equal to 0.1 dB/100 turn, and, preferably, a macrobending loss at a wavelength of 1625 nm when bending is made at the diameter of 60 mm is smaller than or equal to 0.1 dB/100 turn. Accordingly, the optical fiber 1 is an optical fiber that conforms to G.652 standard in terms of the MFD, λcc, and the macrobending loss and that has high compatibility with respect to G.652 standard.

Furthermore, the optical fiber 1 preferably meets the characteristics indicating that a zero dispersion wavelength is larger than or equal to 1300 nm and smaller than or equal to 1324 nm and a dispersion slope at the zero dispersion wavelength is smaller than or equal to 0.092 ps/nm$^2$/km, and more preferably meets the characteristics indicating that a dispersion slope is larger than or equal to 0.073 ps/nm$^2$/km.

Furthermore, the optical fiber 1 has a smaller diameter with a cladding diameter that is less than 100 μm, and that is one digit smaller than the cladding diameter, which is about 125 μm, of the standard SMF. As a result, the glass diameter of the optical fiber 1 is notably smaller, and a cross-sectional area of the optical fiber 1 is notably reduced, so that it is suitable for implementing a high-density optical fiber cable.

Furthermore, in order to implement effective cutoff wavelength described above, it is preferable that the core portion 1*a* be set such that the effective cutoff wavelength is smaller than or equal to 1260 nm, and, in particular, it is preferable that the diameter 2*a* be set such that the effective cutoff wavelength is smaller than or equal to 1260 nm. Furthermore, if the core portion 1*a*, in particular, the diameter 2*a*, is set such that the effective cutoff wavelength is larger than or equal to 1000 nm, it is possible to reduce macrobending loss, which is preferable.

Furthermore, if the outer diameter of the optical fiber 1 including the coating portion 1*c* is smaller than or equal to 210 μm, the outer diameter is able to be made smaller in size than the outer diameter, which is about 250 μm, including the resin coating portion of the standard SMF, so that the cross-sectional area of the optical fiber 1 is notably reduced.

Here, in the optical fiber, if the glass diameter, that is, the cladding diameter, is reduced, a microbending loss (also called a lateral pressure loss) is increased. In general, a transmission loss of the optical fiber is increased in a state of the optical fiber cable. An amount of increase in the transmission loss at this time has a close relationship with a microbending loss, and if a microbending loss is large, the amount of increase is also large.

In the optical fiber 1 according to the present embodiment, if a microbending loss is smaller than or equal to 20 times the microbending loss at a wavelength of 1550 nm of the standard SMF, the microbending loss is able to be regarded as a microbending loss used on a practical level. Furthermore, if a value standardized in the microbending loss in the standard SMF specified as the standardized microbending loss, the standardized microbending loss in the optical fiber 1 according to the present embodiment is preferably smaller than or equal to 20, and more preferably be smaller than or equal to 10. To reduce the microbending loss, it is preferable that, in the coating portion 1c having the two-layer structure, the thickness of the primary coating layer 1ca is larger than or equal to 15 μm. Here, the value of 20 in a case where the standardized microbending loss is assumed to be smaller than or equal to 20 is a value enabling the microbending loss to be reduced to a practical level even after the cabling.

Furthermore, regarding the microbending loss, it is possible to use a value measured by using a fixed diameter drum method (a type of an abrasive paper method) or a value measured by using an extension drum method that is a type of the abrasive paper method specified by JIS C6823: 2010_10. Furthermore, the microbending loss may also be a value measured by a wire mesh method or a value measured by using another measurement method (for example, an oblique winding method).

In the following, the optical fiber according to the embodiment will be described with reference to the results of simulation calculation.

First, regarding the optical fiber having a step-type or a W-type refractive index profile illustrated in FIG. 2, calculation of the optical characteristics is performed by using various combinations obtained by comprehensively changing the structure parameters, such as Δ1, Δ2, 2a, 2b, to various values. At this time, combinations are optimized such that the MFD, λcc, and the macrobending loss included in the optical characteristics meet G.652 standard. In a description below, the MFD, λcc, and the macrobending loss are sometimes referred to as the main characteristics.

As a result of calculation, in both of the step-type and the W-type, it was confirmed that combinations of structure parameters indicating that the main characteristics meet 6.652 standard is present when the relative refractive-index difference Δ1 is larger than or equal to 0.33% and smaller than or equal to 0.40%. Furthermore, in a case of the W-type, it was confirmed that combinations of structure parameters indicating that the main characteristics more preferably meet G.652 standard is present when Δ2 is larger than or equal to −0.20% and less than 0% and when b/a is smaller than or equal to 5.

Subsequently, systematic studies are performed on the combinations of structure parameters indicating that the main characteristics meet G.652 standard by performing verification by changing a glass diameter, an outer diameter (primary diameter) of the primary coating layer, an outer diameter (secondary diameter) of the secondary coating layer to various values. As the results of the studies, in both of the step-type and the W-type, it was confirmed that the glass diameter and the primary diameter (or, a primary thickness that is a thickness of the primary coating layer) are the dominant factor of the microbending loss characteristics of the optical fiber.

Figure 3:
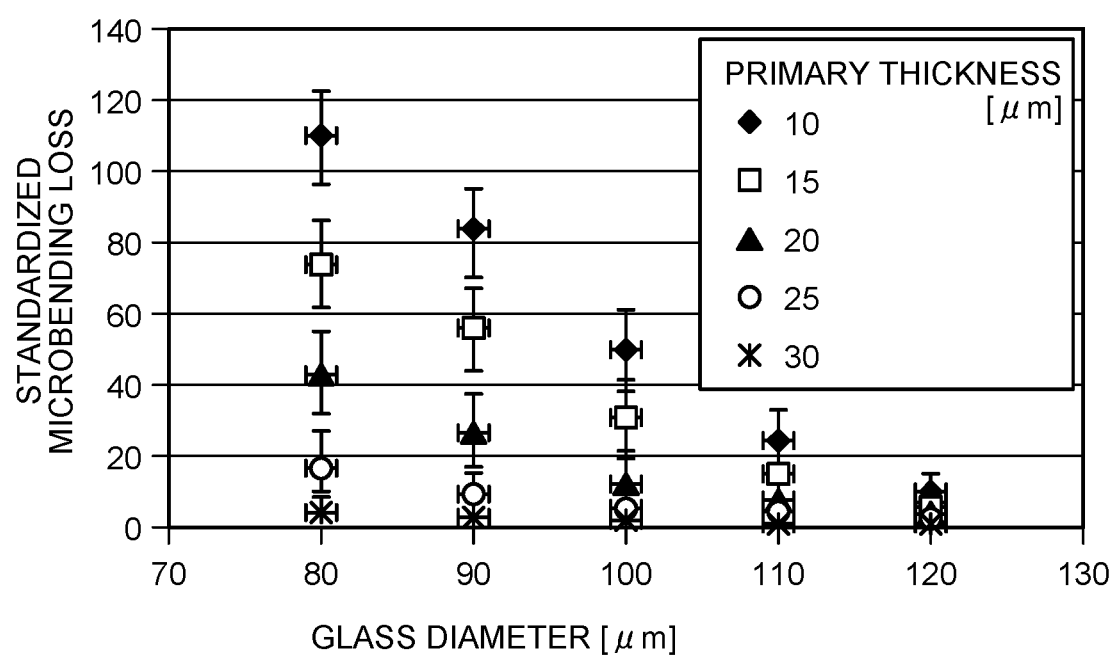
FIG. 3 is a diagram illustrating an example of a relationship between a glass diameter and a standardized microbending loss.

FIG. 3 is a diagram illustrating an example of a relationship between the glass diameter and the standardized microbending loss obtained when the primary thicknesses are 10 μm, 15 μm, 20 μm, 25 μm, and 30 μm. Moreover, regarding the value of the glass diameter is mainly changed to 80 μm, 90 μm, 100 μm, 110 μm, and 120 μm; therefore, the range of the change in values is indicated by using a bar extending in the horizontal axis direction. Furthermore, regarding the standardized microbending loss, values are varied in accordance with the combinations of the structure parameters indicating that the main characteristics meet 6.652 standard and in accordance with the secondary diameter that are used at the time of calculation; therefore, the range of the width is indicated by using a bar extending in a vertical axis direction.

Moreover, in FIG. 3, it needs to be noted that the lower limit of an error bar in the vertical axis direction extends to the level smaller than or equal to 20 in a case where the glass diameter is 100 μm and in a case where the primary thickness is 15 μm.

As a result of the systematic studies illustrated in FIG. 3, if the glass diameter is set to be less than 100 μm, it was confirmed that there is a case that enables the standardized microbending loss to be smaller than or equal to 20 by setting the primary thickness to 15 μm or more. Furthermore, by setting the primary thickness to a value larger than or equal to 20 μm, it was confirmed that the range in which the standardized microbending loss may be further reduced and the standardized microbending loss may be smaller than or equal to 20.

Furthermore, the optical fiber according to the present embodiment is able to be manufactured by drawing a glass optical fiber from an optical fiber preform using a known drawing device and by coating on the glass optical fiber. It is desirable that the secondary thickness be larger than or equal to 10 μm in consideration of operability of the process of forming the secondary coating layer.

Based on the results from the studies described above, the optical fiber 1 according to the present embodiment has the structure in which the main characteristics meet G.652 standard, the glass diameter is less than 100p, the primary thickness is larger than or equal to 15 μm, preferably larger than or equal to 20 μm, the secondary thickness is larger than or equal to 10 μm, and the standardized microbending loss is smaller than or equal to 20. In this case, the outer diameter (fiber diameter) of the optical fiber 1 including the coating portion 1c is a value that is larger than or equal to 50 μm with respect to the glass diameter, or preferably be a value that is larger than or equal to 60 μm. Accordingly, a minimum fiber diameter and a preferable fiber diameter in a case where the glass diameter is each of 75 μm, 80 μm, 85 μm, 90 μm, and 95 μm are the value indicated in Table 1. As indicated in Table 1, with the optical fiber 1 according to the present embodiment, it is possible to set the fiber diameter in the range of 125 μm to 155 μm. Moreover, if a glass diameter is set to be larger than or equal to 75 μm, handling is facilitated and a microbending loss is relatively small, which is preferable.

TABLE 1

| glass diameter [μm] | 75 | 80 | 85 | 90 | 95 |
|---|---|---|---|---|---|
| minimum fiber diameter [μm] | 125 | 130 | 135 | 140 | 145 |
| preferable fiber diameter [μm] | 135 | 140 | 145 | 150 | 155 |

As an example of the present disclosure, an optical fiber having a W-type refractive index profile has been manufactured by using a known method. The structure parameters are set such that Δ1 is 0.37%, Δ2 is −0.03%, b/a is 2, and 2a is 8 μm. Furthermore, the glass diameter is set to 90 μm, the primary diameter is set to 135 μm, and the secondary diameter is set to 170 μm. The material of the coating portion and a Young's modulus are the same as those described in the embodiment.

The optical characteristics of the optical fiber in the example are illustrated in Table 2. Furthermore, the standardized microbending loss is measured by using the abrasive paper method. As indicated in Table 2, the optical fiber in the example indicates that the transmission loss at a wavelength of 1550 nm is low, such as 0.19 dB/km, and λcc, the macrobending loss, the MFD, zero-dispersion wavelength ($\lambda_0$), and the dispersion slope meet G.652 standard and exhibits high compatibility with G.652 standard. Furthermore, in the optical fiber in the example, a value of the bending loss at a wavelength of 1625 nm when bending is made at a diameter of 60 mm sufficiently meet G.652 standard. Furthermore, in the optical fiber in the example, the standardized microbending loss is small, such as 11.9, and furthermore, the glass diameter is 90 μm, and the fiber diameter is 170 μm, which are small diameters.

TABLE 2

| transmission loss @ 1550 nm [dB/km] | λcc [nm] | macro bending loss (60 mm) @ 1550 nm [dB/100 turn] | MFD @ 1310 nm [μm] | zero dispersion wavelength [nm] | dispersion slope @ zero dispersion wavelength [ps/nm²/km] | standardized microbending loss @ 1550 nm |
|---|---|---|---|---|---|---|
| 0.19 | 1237 | 0.03 | 8.82 | 1319 | 0.084 | 11.9 |

Moreover, a measurement result of a bending loss at the wavelength of 1550 nm that is obtained when the optical fiber in the example is bent at a diameter of 30 mm is larger than 0.25 dB/10 turn. Accordingly, the optical fiber in the example does not meet the specification of the bending loss prescribed in G.657 standard.

Furthermore, as a comparative example, an optical fiber that has the same W-type refractive index profile as that in the example, and that has a glass optical fiber having a glass diameter of 90 μm, having a primary diameter of 110 μm, i.e., a primary thickness of 10 μm, and having a secondary diameter of 145 μm is manufactured. As a result, the standardized microbending loss is 73.1, which is significantly larger than that in the example. This may indicate that setting of the primary thickness to be an appropriate value larger than or equal to 15 μm is effective for reducing a microbending loss.

Moreover, in the present embodiment described above, the step type and the W type are exemplified as the refractive index profiles. The step type and the W type are preferable because of simple refractive index profiles and high manufacturability. However, the present disclosure is not limited to this and other refractive index profiles, such as a trench type, a segment core, or a W plus side core type, may also be used.

Furthermore, the present disclosure is not limited to the embodiment described above. The present disclosure also includes those formed by combining components of the embodiments as appropriate. Furthermore, further effects and modifications will readily occur to those skilled in the art. Therefore, wider aspects of the present disclosure are not limited to the embodiments described above, and various modifications may be made.

The optical fiber according to the present disclosure is suitable for use in the field of optical communication, such as data communication or telecommunication.

According to the present disclosure, an advantage is provided in that it is possible to implement an optical fiber having high compatibility with respect to G.652 standard and further smaller diameter.

The invention claimed is:

1. An optical fiber comprising:
   a core made of silica based glass;
   a cladding made of silica based glass and configured to cover an outer periphery of the core, the cladding having a refractive index that is lower than a maximum refractive index of the core; and
   a coating configured to cover an outer periphery of the cladding, the coating including
      a primary coating layer located on the cladding side, and
      a secondary coating layer located on an outer peripheral side of the primary coating layer, wherein
   the core includes a central core portion and a depressed layer that is formed an outer periphery of the central core portion,
   the optical fiber has a W-type refractive index profile,
   a relative refractive-index difference Δ1 of the central core portion with respect to the cladding is larger than or equal to 0.33% and smaller than or equal to 0.40%,
   a relative refractive-index difference Δ2 of the depressed layer with respect to the cladding is larger than or equal to −0.20% and less than 0%,
   when a core diameter of the central core portion is 2a, and an outer diameter of the depressed layer is 2b, b/a is smaller than or equal to 5,
   an outer diameter of the cladding is less than 100 μm,
   a thickness of the primary coating layer is larger than or equal to 15 m,
   a mode field diameter at a wavelength of 1310 nm is larger than or equal to 8.6 μm and smaller than or equal to 9.2 μm,
   an effective cutoff wavelength is smaller than or equal to 1260 μm, and
   a bending loss at a wavelength of 1550 rim when bending is made at a diameter of 60 mm is smaller than or equal to 0.1 dB/100 turn.

2. The optical fiber according to claim 1, wherein
   a zero dispersion wavelength is larger than or equal to 1300 nm and smaller than or equal to 1324 nm, and
   a dispersion slope at the zero dispersion wavelength is smaller than or equal to 0.092 ps/nm²/km.

3. The optical fiber according to claim 1, wherein the microbending loss at the wavelength of 1550 nm is smaller than or equal to 20 times a microbending loss at a wavelength of 1550 nm of a standard optical fiber that has characteristics conforming to standards defined by ITU-T G.652 and that includes a resin coating with a thickness of 62.5 μm on an outer periphery of the cladding.

4. The optical fiber according to claim 3, wherein the microbending loss is a value measured by using an abrasive paper method or a wire mesh method.

5. The optical fiber according to claim 1, wherein the core is set such that an effective cutoff wavelength is larger than or equal to 1000 mn and smaller than or equal to 1260 nm.

6. The optical fiber according to claim 1, wherein
the outer diameter of the cladding is smaller than or equal to 75 μm, and
the thickness of the primary coating layer is smaller than or equal to 30 μm.

7. The optical fiber according to claim 1, wherein an outer diameter of the optical fiber including the coating is smaller than or equal to 210 μm.

* * * * *